Figure 1:
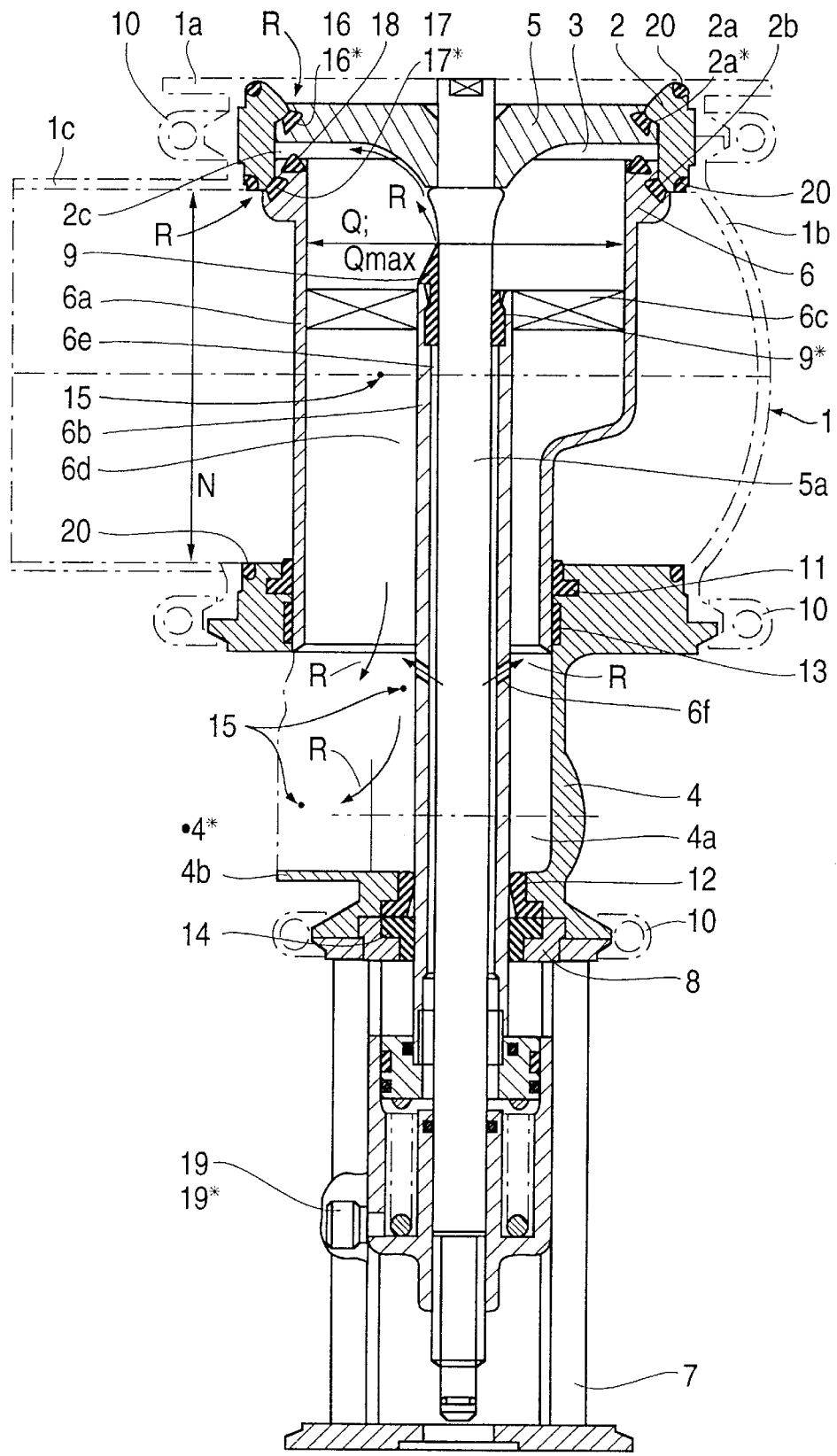

United States Patent [19]
Mieth

[11] Patent Number: 5,806,554
[45] Date of Patent: Sep. 15, 1998

[54] DOUBLE SEAT VALVE

[75] Inventor: Hans Otto Mieth, Büchen, Germany

[73] Assignee: Otto Tuchenhagen GmbH & Co. KG, Büchen, Germany

[21] Appl. No.: 256,192

[22] PCT Filed: Feb. 5, 1993

[86] PCT No.: PCT/EP93/00278

§ 371 Date: Jun. 28, 1994

§ 102(e) Date: Jun. 28, 1994

[87] PCT Pub. No.: WO03/16307

PCT Pub. Date: Aug. 19, 1993

[30] Foreign Application Priority Data

Feb. 8, 1992 [DE] Germany .......................... 42 03 723.9
Feb. 8, 1992 [DE] Germany .......................... 42 03 724.7

[51] Int. Cl.⁶ ................................ F16K 11/20; B08B 9/06
[52] U.S. Cl. ..................... 137/240; 134/166 C; 137/312; 137/614.18
[58] Field of Search .................................. 137/240, 312, 137/614.17, 614.18, 614.19, 614.16; 134/166 C

[56] References Cited

U.S. PATENT DOCUMENTS

| | | | |
|---|---|---|---|
| 4,304,251 | 12/1981 | Schadel et al. | 137/614.18 |
| 4,368,753 | 1/1983 | Brakelmann et al. | 137/614.18 |
| 4,373,545 | 2/1983 | Knappe | 137/614.17 |
| 4,436,106 | 3/1984 | Tuchenhagen | 137/240 |
| 4,460,014 | 7/1984 | Mases et al. | 137/614.18 |
| 4,522,223 | 6/1985 | Balsys et al. | 137/614.17 |
| 4,552,167 | 11/1985 | Brakelmann | 137/614.17 |
| 4,605,035 | 8/1986 | Rasmussen et al. | 137/614.17 |
| 4,617,955 | 10/1986 | Melgaard | 137/614.17 |
| 4,655,253 | 4/1987 | Ourensma | 137/614.18 |
| 4,687,015 | 8/1987 | Mieth | 137/614.18 |
| 4,856,551 | 8/1989 | Brakelmann | 137/614.18 |
| 5,085,241 | 2/1992 | Mieth | 137/614.18 |
| 5,575,305 | 11/1996 | Mieth | 137/240 |

FOREIGN PATENT DOCUMENTS

| | | |
|---|---|---|
| 0126744 | 3/1987 | European Pat. Off. . |
| 3030989 | 2/1982 | Germany . |
| 3133273 | 3/1983 | Germany . |
| 3211692 | 10/1983 | Germany . |
| 2119480 | 11/1983 | United Kingdom . |

OTHER PUBLICATIONS

Fuchslocher/Schulz: "Die Pumpen", 12th Edition, 1967, pp. 325, 326.

Pohlenz, W.: "Pumpen fur Flussigkeiten", 4th Edition, 1984, pp. 126, 128.

*Primary Examiner*—George L. Walton
*Attorney, Agent, or Firm*—Lane, Aitken & McCann

[57] ABSTRACT

A double seat valve has two serially arranged closure members that are movable with respect to each other, that prevent in the closed position of the valve fluids from overflowing from one part (1a) into another part (1b) of the valve housing and that delimit both in the closed and in the open position of the valve a leakage cavity (3). The valve rods (5a, 6a) for the closure members (5, 6) are concentrically arranged inside each other and unilaterally extend out of one part of the valve housing into the surroundings of the valve. The disclosed double seat valve satisfies the requirement for a leakage cavity that can not be drained, but also pressure-relieved in all imaginable operating conditions. For that purpose, the valve rod of the second closure member (6) designed as a hollow rod (6a) inwardly delimits a part (6d) of a connection path (15) which is enlarged up to a through-flow cross-section (Q) immediately after the leakage cavity (3) and in a part of its ulterior course, thus increasing the space available for the leakage cavity (3).

9 Claims, 2 Drawing Sheets

DOUBLE SEAT VALVE

The invention relates to a double seat valve with two serially mounted closure elements movable relative to each other, as described in the preamble of claim 1.

The many years of additional development of the double seat valve indicated in the foregoing have resulted in a number of features, some of which are indispensable and some of which are desirable. These features are described concisely below, without their being assigned to either category:

- automatic removal of the leakage occurring during operation and/other leakages from the leakage cavity into the environment of the double seat valve (hereafter designated concisely as "drainage");
- disassembly of interior elements of the valve on the drive side;
- seat fastened to the housing (the valve seats may remain in the housing during joint disassembly of the drive and the interior valve elements);
- free choice of sealing means for the closure elements with respect to their direction of action relative to the associated seat surface (in what follows the sealing means are designated as "radial sealing means" with reference to radially sealing closure elements, in contrast to axially sealing closure elements, so-called seat plates, with "axial sealing means," in the case of which these means preferably act in the axial direction);
- seat cleaning capability as a result of lifting of the closure elements;
- low-leakage or leakage-free switching;
- relief of pressure in the leakage cavity, for example during lifting of the closure elements for the purpose of seat cleaning;
- compliance with the United States "3A Standard," according to which the leakage cavity, with a cross-section corresponding to the rated width of the largest pipe connected to the valve, is to be drainably connectable to the atmosphere.

Figure 2:
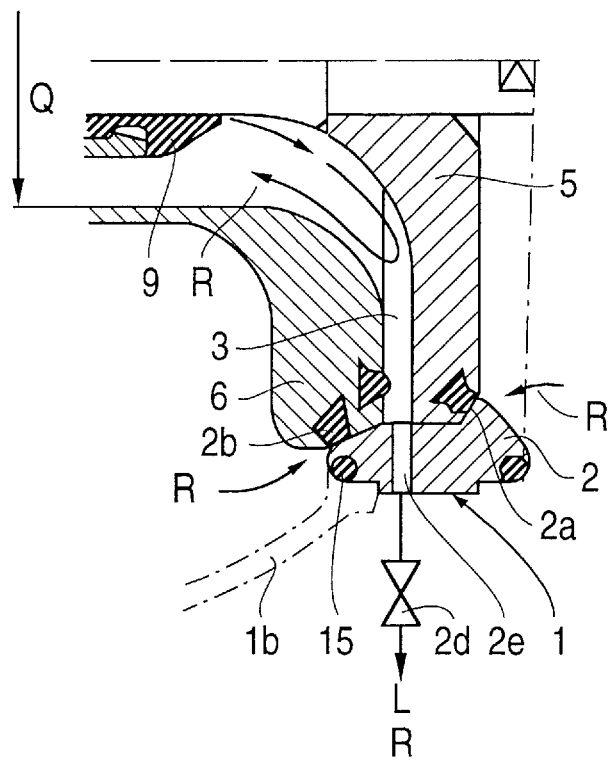

Double seat valves exist in essentially two basic structures, of which the valve referred to initially represents one typical structure and is described, for example, in U.S. Pat. No. 4,436,106 A (FIGS. 1 and 2). The other basic structure is described for the first time in DE 25 32 838 A1. Neither of these two valves nor other comparable double seat valves having these structures have thus far been capable of embodying all the features enumerated.

The double seat valve known from U.S. Pat. No. 4,436,106 A (FIGS. 1 and 2), with its axially sealing closure elements, can be applied in the installed position illustrated in the referenced document, for example, if the space available below the lower valve housing element is limited. In essence it may be installed in any desired installation position, for example, even rotated through an angle of 180 degrees, that is, with valve rods oriented vertically downward or in a horizontal or oblique mounting. With the valve rods oriented vertically, the leakage fluid can drain independently under the influence of gravity (by way of the annular gap between the valve rod and the hollow rod; FIG. 2), or again the leakage fluid and, if applicable, the cleaning means deliverable from the vicinity of the valve over another connection, may drain without problem (see FIG. 1 for an illustration of the hollow valve rod).

The seating surfaces are additionally susceptible of seat cleaning to the extent that the possibility is provided of a partial lifting movement. In this instance the cleaning means flowing by way of the uncovered seat surfaces into the leakage cavity as a rule drains into the environment of the double seat valve by way of the annular gap between the hollow rod and the valve rod. The second path of connection to the leakage cavity inside the valve rod then communicates with a cleaning line taken to the double seat valve from the outside, so that, as explained above, cleaning of the leakage cavity is possible in both the closed and the open position.

The state-of-the-art double seat valve is characterized essentially by drainage of the leakage cavity, with the valve seat fastened to the housing, and opening movement and extensibility in the direction of drive. The drainage process does not meet the 3A requirement, in that this requirement states specifically that the connection path between the leakage cavity and the vicinity of the double seat valve is to be developed with the rated drainage cross-section of the latter. The rated drainage cross-section of the double seat valve is here defined as the cross-section of the largest possible pipe that can be attached to the housing connections of the valve.

There are additionally areas of application in the sphere of process technology, that of asepsis among others, in which a simple separation of product area (interior of the valve housing) and the environment of the double seat valve by means of a single dynamically stressed seal is not desired or cannot be tolerated. A sealable safety zone, a sealable space between product area and the vicinity of the double seat valve as it were, is required in these cases.

Removal of the leakage, and the cleaning means if applicable, is accomplished in the case of the double seat valve, according to U.S. Pat. No. 4,436,106, by way of connections on the valve rods both of which execute the movement operating the valve. This is not advantageous, in that the connection problem can be solved only with relatively great design effort (involving flexible line connections) and thus at relatively high cost.

The object of this invention is further to develop the double seat valve of the kind described in the foregoing in such a way that the requirement for a leakage cavity that is both drainable and relieved of pressure (3A requirement) can be met under all conceivable operating conditions. The invention pursues in particular the object of preventing occurrence of pressure peaks in the leakage cavity or of limiting such spikes to a tolerable magnitude when the closure elements are lifted for seat cleaning purposes.

This object is attained by application of the distinctive features set forth in claim 1. Advantageous embodiments of the proposed double seat valve are set forth in the subordinate claims.

The double seat valve of the kind characterized in the foregoing has in one of its embodiments a connecting path between the leakage cavity and the environment of the valve, this path being formed in the annular gap between valve rod and the hollow rod surrounding the latter. In a second embodiment a second connecting path is additionally provided in the inner valve rod. The connecting path inside the valve rod is used preferably for the delivery of cleaning means, inasmuch as the cross-section of this path is limited by the overall dimension of the valve rod. In both embodiments the annular gap between valve rod and hollow rod is designed with a relatively small aperture cross-section and is used preferably for removal of the cleaning fluid from the leakage cavity both in the case of external cleaning agent delivery (FIG. 1) and in that of seat cleaning (FIG. 2). The state-of-the-art double seat valve incidentally makes it clear that conservation of as much space as possible in design of the leakage cavity between the two closure elements has always been a universally recognized dimensioning principle for the purpose of minimizing the areas to be cleaned.

On the other hand, in practical operation of double seat valves so-called seat cleaning by closure element lifting has continually increased in importance, without the design and dimensioning criteria for the leakage cavity and the drainage process having been revised. Thus far it has not been recognized, or its importance for the overall safety philosophy of the double seat valve has been underestimated, that an impermissible pressure buildup may occur in the leakage cavity because the drainage discharge cannot remove the incoming amounts without a pressure difference relative to the goal of liquid transport.

The idea underlying the invention begins with the understanding that, assuming that sensible use is made of the fact that seat cleaning by lifting is always intermittent, that is, takes place in the form of controlled brief timed lifts of the closure elements, the cleaning fluid enters the leakage cavity with high instantaneous output but in a limited volume per cycle. If a sufficient leakage cavity storage volume is made available for this amount of liquid, the drainage process no longer necessarily involves simultaneous removal of the liquid at its intake output and lowering of the pressure peak the process being the more efficient, the greater is the storage volume in relation to the amount of liquid determined by the lift cycle. In each instance the storage volume be large enough so that a gas space is retained in storage even with the largest amount of fluid. If this volume of gas is highly compressed, the pressure buildup again approaches the pressure peak in the original narrow leakage cavity, and this peak must be avoided at all costs.

The enlargement of the conventional narrow leakage cavity, to be provided in accordance with the first principle of the invention, to the largest closed storage volume possible within the limits of the volume relationships is indeed suitable for lowering the pressure peak as explained above, but not for complete elimination of the peak. It is claimed for the invention that the latter requires an additional measure, one whereby the connecting path present in the double seat valve described above between the leakage cavity and the surroundings of the valve, a path thus far used for external cleaning fluid delivery, is prepared as a second atmospheric connection of the leakage cavity for pressure relief.

If this path is additionally used as a path for delivery of cleaning or disinfection means, inasmuch as this type of treatment is considered to be necessary for system-specific reasons for microbiological control of the double seat valve along with seat cleaning, it is claimed for another advantageous development of the invention that this path is outfitted at the inlet for the medium with a reversible connection for medium and atmosphere.

The expansion claimed for the invention of the leakage cavity to a reservoir with or without controllable venting, with a small cross-section designed exclusively for expulsion through the drainage process of air displaced when the reservoir is filled and air drawn in when the reservoir is empty, or for external delivery of a cleaning agent, encounters a functional limit when the storage reservoir overflows. A situation such as this may arise in actual operation in the event of malfunction of the lifting mechanism such as failure of the lifting mechanism, inadvertent prolonged actuation, inhibition of closing of the closure element by wedged-in foreign bodies, or damage to the sealing means of the closure elements. When such events occur the reservoir is filled, with the result that fluid enters the connecting path also used for venting (such as the annular gap between the inner hollow rod and the valve rod), and the pressure described above, which is incompatible with the safety philosophy of the double seat valve, again comes to prevail in the reservoir.

The venting connection by way of the narrow, function-modified, external cleaning agent intake can make only a small contribution to pressure relief if fluid enters the connection in place of air when the reservoir space is overfilled. And it is here that the next stage of the invention comes into play, a stage in which provision is made for continuation of the largest possible diameter, one permitting disassembly of the interior of the valve on the drive side, into the environment of the valve at the full cross-section diameter. This cannot, of course, be accomplished with the dimensioning and design rules previously applied to such connecting paths. It is claimed for the invention that in this connection the connecting path is enlarged, immediately adjacent to the leakage cavity and in a part of its subsequent course, to an aperture diameter relative to the remaining part of the path having the effect of increasing the capacity of the leakage cavity. As a result, the leakage cavity, in contrast to previous state-of-the-art designs, acquires the storage volume required for limiting pressure peaks. In principle the storage volume to be provided can be created with the enlarged passage diameter provided, in conjunction with the available designed length. It is essential to make certain in determination of dimensions that, when the closure elements are lifted, the fluid to be received into the enlarged leakage cavity will not reach the part of the connecting path that, while still large enough for venting, because of its reduced cross-section cannot ensure unpressurized removal of the pressure relief overflow in the event of entry and movement of fluid.

The most effective enlargement of the leakage cavity is ensured when the aperture cross-section Q of the extended portion of the connecting path is given dimensions such that its value Qmax is brought as close as possible to that of the rated passage cross-section N of the double seat valve ($N \leq N$) or is even made to exceed this value wherever such is structurally possible.

Pressure increases in the leakage cavity are prevented with the greatest certainty or most effectively limited if the total connecting path between the leakage cavity and the environment of the valve is designed in its entirety with the aperture cross-section Qmax.

Closure of the connecting path on the valve environment side makes certain that this connection will be open to this environment only if it is to perform its function as a path for pressure relief leakage. It remains closed in all other operational states, to protect against entry of foreign matter from the outside.

Connection of the connecting path as a function of the storage volume of the enlarged leakage cavity occupied by fluid is made controllable against the event that pressure relief leakage will be required, an occurrence which is of course not subject to systematic influencing control.

With the connecting path designed so as to be continuous and to have an enlarged aperture cross-section area, the connection to this connecting path on the valve environment side has correspondingly large dimensions which make it difficult to connect the lines needed for continuation of the pressure relief leakage. When use is made of a drainage housing that is rigidly connected to the second valve housing component through which the hollow rod extends and which is movably engaged by the hollow rod of the second closure element, the connection problem in question can be solved in an extremely advantageous and simple manner, since in this instance the connection is designed to be stationary.

The diameter of the hollow rod can be increased to the extent that the 3A requirement is adequately met. The drainage housing with its interior cavity simultaneously forms a closable safety zone between product space and the environment of the double seat valve. The hollow rod, and accordingly the closure element connected to it, are mounted in and routed through the area in which they extend through the associated valve housing element and the adjacent drainage housing. An additional mounting and routing option is available for the associated closure element, specifically on the valve rod connected to the other closure element, the latter valve rod being actuated by an independent valve drive.

In the event that the inner hollow rod is lengthened to extend into a valve drive in the proposed double seat valve, as is provided in another development, comprehensive seat cleaning of all seat areas of the double seat valve is ensured, provided that the valve drive is capable of producing the partly open positions required for the closure elements of the valve.

If an annular gap ending in the leakage cavity is formed between the inner hollow rod and the valve rod with a connection for delivery of a cleaning and/or rinsing fluid, the annular gap will be susceptible of rinsing and cleaning. Connection in this instance may be effected inside or outside the drainage housing.

The proposed double seat valve accordingly has two connecting paths between its environment and its leakage cavity, that is, a connecting path for pressure relief leakage between hollow rod and inner hollow rod and a second connecting path either for delivery of cleaning fluid from the environment of the double seat valve inside the annular gap between valve rod and inner hollow rod or for venting the leakage cavity and the adjacent enlarged section of the connecting path.

In the proposed double seat valve both two axially sealing and two radially sealing closure elements may be provided, the latter being accommodated in a common cylindrical seating; a combination of radial and axial closure elements is also possible.

If, with a closure element configuration of radially and axially sealing closure elements, the hollow rod connected to the axial closure element is designed to have an inner diameter the same as that of the cylindrical valve seat and with the axial closure element in the closed position, its inner diameter and that of the cylindrical valve seat are interconnected with no difference in diameter, as the radial closure element performs its opening movement this element is received into the hollow rod and effects sealing before the axial closure element opens. This configuration makes it possible to mount the double seat valve horizontally and in doing so to ensure perfect and complete drainage of the leakage cavity.

If the last-named closure element configuration is not present, and should the closure element nevertheless be mounted horizontally in one of the other possible configurations, the provision is made that the leakage cavity is to be connected to the environment of the double seat valve by way of a controllable outlet opening made in the valve housing between the valve seats and by way of a check valve. This make it possible to remove the puddle of liquid formed between the two closure elements in the area of the leakage cavity into the environment of the double seat valve.

The closure element configurations referred to in the foregoing of course do exert their effect on the necessary design of the valve drive. Such considerations are, however, relevant to the present invention only to the extent of making it clear that the advantages that can be obtained with the invention are not limited exclusively to the closure element configurations shown in the figures.

If the sealing means of the closure elements in the potential configurations described in the foregoing are designed with at least one radially sealing closure element in such a way that these means, starting with application or engagement of the closure element to or in the closure element and to or into the open position of the valve, additionally effect a sealing of the closure elements relative to each other and of the leakage cavity relative to the interior space of the valve housing parts, then the actuation leakages that occur when the double seat valve is actuated are reduced to an absolute minimum or are fully prevented.

The proposed double seat valve in the embodiment described in the foregoing is susceptible of cleaning in the area of its leakage cavity by way of the annular gap between the valve rod and inner hollow rod, both in its closed and in its open position. Seat cleaning is also possible with proper design of the valve drive. This can be accomplished by transferring the closure elements to partly open positions; however, cleaning of cylindrical seat surfaces with the valve in the closed position is also possible, through movement of the closure elements in opposite directions, the cleaning agent required being introduced from outside or "harvested" in other areas of the double seat valve (cf the cleaning process as described in DE 41 18 874 A1).

In addition, the annular gap can be filled during the travel of the product with a blocking liquid such as water, by way of the connection provided in the environment of the double seat valve, so that penetration of product, for example, from actuation leakage or a defect in the seat seals, is rendered highly improbable.

In another embodiment of the proposed double seat valve provision is made such that the interior hollow rod has openings in the form of spray nozzles connecting the annular gap with the connecting path and/or the interior of the outlet housing. This makes possible targeted cleaning of all cleaning-critical areas inside the leakage cavity, the connecting path (for example, connecting strips between the hollow rods), and the interior of the outlet housing, through delivery of cleaning and/or rinsing fluid by way of the annular gap from outside the double seat valve.

The necessary cleaning of the outlet housing, in which the connecting path ends, then becomes especially simple and effective if an annular gap that on one side ends in the interior of the first housing and that on the other side is connected to a stationary connection on the housing of the double seat valve is provided between the inner hollow rod and a housing sealing element that seals the first housing for the valve drive and through which the inner hollow rod extends.

If external delivery of cleaning means to the leakage cavity and/or venting of this cavity by way of the annular gap between inner hollow rod and valve rod can or should be avoided, the annular gap should be closed off by means of a seal on the leakage cavity side. In this instance the connection to the annular gap on the valve environment side may serve to indicate and if necessary carry away leakages. It thus acts as an indicator of the condition of the sealing of the annular gap on the leakage cavity side.

Figure 3:
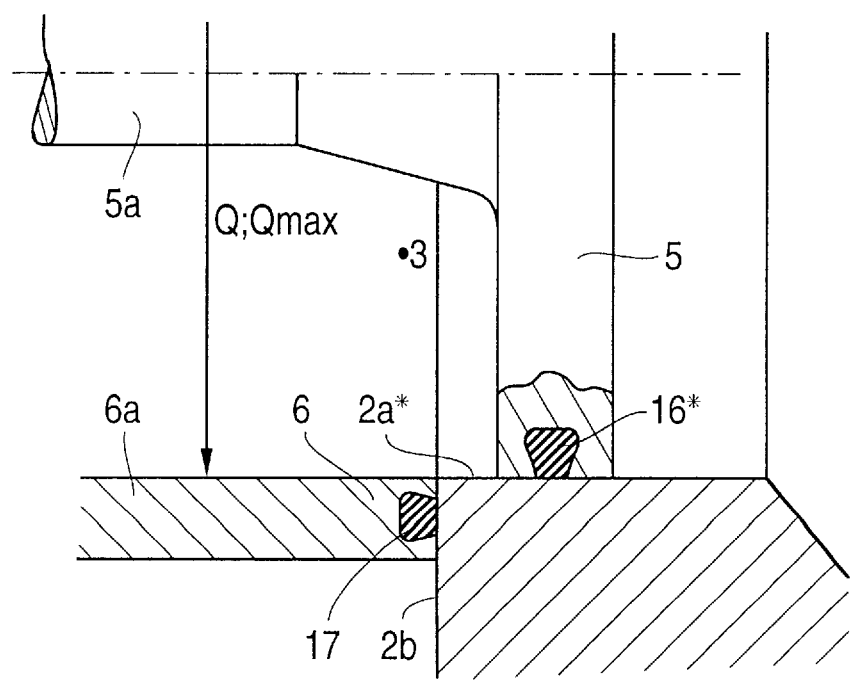

An exemplary embodiment of the present invention is shown in the accompanying drawing and is described in greater detail in what follows. In the drawing FIG. 1 presents a cross section through the proposed double seat valve in an advantageous configuration with an outlet housing connected to the valve housing element, the inner hollow rod projecting from the latter into the cage housing leading to the valve drive;

FIG. 2 shows a cross section through the seat area of another configuration of the proposed double seat valve as presented in FIG. 1, installed horizontally in conjunction with a second leakage outlet; and FIG. 3 shows a cross section through another configuration of the proposed double seat valve as shown in FIG. 1 in the area of the valve seats.

The double seat valve is shown in the installed position (FIG. 1), in which the two valve rods leading to the valve drive are oriented vertically downward. A valve housing 1 consists of a first and a second valve housing element 1a and 1b. While the latter is connected by way of a connecting adapter 1c, for example, to a pipeline not shown, the former is designed as a tank bottom in the valve arrangement shown here. Hence the double seat valve acts in this specific application as a tank outlet valve. Adjoining the second valve housing element 1b at the bottom is an outlet housing with an interior space 4a and a pipe 4b connecting the latter to the environment of the valve. In the area of connection of the first and the second valve housing element 1a and 1b there is mounted a seat ring 2 that forms the valve seat area by way of its first seat surface 2a in conjunction with a smaller closure element 5 and its second valve seat area 6. The closure elements 5 and 6 are in the present case designed so as to provide axial sealing and between them delimit a leakage cavity 3.

A lantern cage housing 7 that effects a connection to a valve drive not shown is mounted below the outlet housing 4. Connection of the two valve housing elements 1a and 1b, one between the second valve housing 1b and the outlet housing 4 and lastly one between the latter and the lantern cage housing 7 are made by way of form-fitting and force-fitted connection means 10. The smaller closure element has a valve rod 5a that extends through the outlet housing 4 and the lantern cage housing 7 and reaches into the valve drive. The larger closure element 6 continues in a hollow rod 6a that ends in the interior space 4a and is designed in the representation on the left side of the figure with the largest possible internal diameter for an axial closure element. In the representation on the right side the hollow rod 6a is narrowed to a smaller diameter in conjunction with a storage volume of enlarged cross section formed by it. In the area of its penetration of the second valve housing 1b, the hollow rod 6a is sealed by a first hollow rod seal 11 mounted inside a connection piece of the outlet housing 4 extending into the second valve housing 1b. A first guide ring 13 also mounted in the outlet housing 4 here assumes the function of guiding the hollow rod 6a.

An inner hollow rod 6b is formed inside the hollow rod 6a by way of strips 6c; the valve rod 5a for the smaller closure element 5 is mounted in and extends into this hollow rod 6b. The inner hollow rod 6b ends on one side in the leakage cavity 3; at this point a nozzle insert 9 is provided that is fastened by form fitting in the inner hollow rod 6b and that performs two functions, that of a guide for valve rod 5a inside the inner hollow rod 6b and that of a spray nozzle for the cleaning agent R that may be in an annular gap 6e between valve rod 5a and inner hollow rod 6b. The inner hollow rod 6b extends on the other side through the outlet housing 4 and from the latter into the cage housing. A second hollow rod seal 12 mounted inside the outlet housing 4 provides for the sealing it requires, while a second guide ring 14 provides for additional control of the hollow rod. This guide ring is embedded in a housing sealing element 8 which is fastened by way of the lantern casing 7 in a recess in the outlet housing 4.

A section (6d) of a connecting path 15 extending from the leakage cavity 3 to the inner space 4a of the outlet housing 4, a section whose aperture cross-section is dimensioned so that it adequately meets the 3A requirement, is provided between the hollow rods 6a, 6b.

Housing seals 20 provide for sealing between the seat ring 2 and the adjacent valve housing sections; the outlet housing 4 of the second valve housing 1b engaging a connection, not shown in detail, of the second valve housing $^{1b}$ is similarly sealed by way of another housing seal 20.

The first closure element 5 is outfitted with axial sealing means 16 that operates in conjunction with the first seat surface 2a; axial sealing means 17 corresponding to the second seat area 2b is provided in the second closure element 6. Another sealing means 18 mounted in the frontal area of the second closure element 6, during the opening movement of the double seat valve and when the latter is in the open position, seals the leakage cavity 3 from the interior of the second valve housing 1b, if the independently actuated first closure element 5 has come to rest against the second closure element 6.

Both the inner hollow rod 6b and the valve rod 5a are introduced into a component not illustrated in detail, one whose basic structure was first described in DE 27 50 833 A1. It consists of various parts; what is essential in the context to be clarified here is that the annular gap 6e formed inside the component between the inner hollow rod 6b and the valve rod 5a is connected to its connection 19 or 19* by way of which the cleaning means R can be delivered or leakage L removed. Leakage is revealed by an indicator of the condition of a seal 9* that is provided if delivery of cleaning agent R is omitted and the annular gap 6e is sealed on the leakage cavity side.

Three possibilities exist with respect to the additional configuration of the inner hollow rod 6b on the end side:

1. As is shown, the inner hollow rod 6b ends inside the lantern casing 7. It is there outfitted with a connection 19 for external delivery of a cleaning agent R.

2. The inner hollow rod 6b is provided with the connection referred to in paragraph 1 above and also extends into the valve drive. This configuration makes it possible, with suitable design of the valve drive, to transfer the larger closure element 6 into a partly open position for the purpose of effecting valve seat cleaning from the second valve housing element 1b.

3. The inner hollow rod 6b ends in the area of the interior 4a of the outlet housing 4. In this instance it assumes the guide and mounting function for valve rod 5a, on which it rests in the direction of the opening in the valve, and additionally makes cleaning of the leakage cavity 3 possible, as described in paragraph 1, if the connection 19 for delivery of cleaning means R is present and has been formed in the interior 4a of the outlet housing 4.

In the event of cleaning of the double seat valve, cleaning means R reaches the leakage cavity 3 from associated valve housing element 1a or 1b, by way of the pertinent cleared seat surfaces of the actuated closure element 5 or 6, and moves thence by way of a part 6d of a connecting path 15 into the outlet housing 4 and then from it over outlet pipe 4b into the connected pipeline not shown in the drawing. In the process the outflowing cleaning means cleans all the surfaces delimiting the leakage cavity 3, part 6d, and the interior 4a of the outlet housing 4. For the purpose of ensuring sanitary conditions in a cleaning process of this kind, this may be an advantageous element if areas especially critical for cleaning in the areas in question are to be subjected to additional cleaning (as for example by way of openings 6f designed as spray nozzles in the course of external cleaning of the annular gap 6e).

Inasmuch as product can occasionally reach the annular gap 6e as a result of actuation leakage, it is necessary on every occasion to subject this annular gap 6e to independent cleaning and rinsing or to seal it off on the leakage cavity side (seal 9*) Not enough of the cleaning means R recoverable from the valve housing elements 1a or 1b by way of valve seat cleaning may in any event enter this annular gap 6e. Hence cleaning of the annular gap requires additional forced delivery of the cleaning means R from the environment of the valve by way of the connection 19 referred to. In the event of sealing of the annular gap 6e on the leakage cavity side, the connection 19 assumes the function of leak indicator 19*.

If the proposed double seat valve is installed horizontally or more or less horizontally, a space is created in the lowest area of the leakage cavity 3 between the closure elements 5 and 6 which cannot be automatically emptied into the environment of the double seat valve. FIG. 2 presents a solution that provides a remedy for this problem. Provision is here made for connection of the leakage cavity 3 to the environment of the double seat valve by way of a seat ring 2 and the adjacent valve housing 1 between the outlet opening mounted between the valve seats 2a, 5; 2b, 6 and an outlet opening 2e controlled by way of a check valve 2d.

In FIG. 3 the closure element 5 is designed to seal radially and the closure element 6 axially. The internal diameter of the hollow rod 6a is designed to be the same as that of the cylindrical valve seat 2a*, so that when the closure elements 5, 6 are in the closed position the internal diameter of the hollow rod 6a and that of the cylindrical seat surface 2a* are flush with each other. As a result, during the opening movement of closure element 5 the radial sealing means 16* of this element is received into the hollow rod 6a to form a seal before the closure element 6, which operates in conjunction with the seat surface 2b by way of its axial sealing means 17, opens. This embodiment ensures, firstly, zero leakage actuation and, secondly, complete drainage of the leakage cavity 3, even when the double seat valve is installed horizontally.

If both closure elements 5, 6 are designed to seal radially, their sealing means 16*, 17* are received on a common cylindrical seat surface 2c so as to effect sealing (see FIG. 1; components are identified there but not specifically shown). The sealing means 16* of the closure element 5 acts in this instance so as to seal exclusively in the radial direction, while the sealing means 17* of the closure element 6 exerts its sealing effect in both the radial and the axial direction. The sealing means 16* may, of course, be designed to be similar to the sealing means 17*, so that when the two closure elements 5, 6 collide during the opening movement of the double seat valve an absolutely gapfree contact of the two closure elements 5, 6 in this area is ensured.

In the context of the embodiment of the proposed double seat valve shown in FIG. 1 there is obtained for the larger closure element 6 with its hollow rod 6a, and with the inner hollow rod 6b connected to it by way of strips 6c, a component having no precedent in the state of the art in the sphere of double seat valves. Firstly, this component consisting of parts 6, 6a, 6b, and 6c is new of its kind, and, secondly, its functional incorporation into the overall arrangement of the proposed double seat valve is also new and only in the context of this overall arrangement does it permit especially advantageous solution of the problem underlying the present invention.

I claim:

1. A double seat valve with two valve seats and two serially mounted closure elements movable relative to each other which prevent overflow of fluids from a first valve housing element to a second valve housing element when the valve is in the closed position and which in both the closed and the open position delimit a leakage cavity which is connected with the environment of the valve, the closure elements comprising a first independently actuated closure element (5) which during its opening movement comes to rest against a second closure element (6), transferring the second closure element (6) to an open position, too, and with first and second valve rods (5a, 6a) which are mounted concentrically one within the other for the closure elements, the first and second valve rods extending through and beyond one of the valve housing elements at one side, characterized in that one of the first and second valve rods is a first hollow rod (6a) and an internal hollow rod (6b) is arranged inside and connected to said first hollow rod (6a), that said first hollow rod (6a) ends in an interior space (4a) of a discharge housing (4) beyond the valve housing element through which said first and second valve rods extend, and that between said first hollow rod and said internal hollow rod a connection path (6d) is provided leading from the leakage cavity (3) to said interior space (4a).

2. The double seat valve according to claim 1, characterized in that a valve rod (5a) is mounted and guided in said internal hollow rod (6b).

3. The double seat valve according to claim 1, characterized in that said connection path has a cross section (6d) dimensioned to be approximately equal to the cross section of the area encompassed by the valve seats (2a, 5; 2b, 6).

4. The double seat valve according to claim 2, characterized in that said internal hollow rod (6b) extends from the inside of said discharge housing (4) to outside said discharge housing (4), in the environment of the valve, that an annular gap (6e) is formed between said internal hollow rod (6b) and said valve rod (5a), and that a connecting piece defines means for feeding a cleansing and/or rinsing liquid to the annular gap.

5. The double seat valve according to claim 4, characterized in that said internal hollow rod (6b) extends into a valve drive.

6. The double seat valve according to claim 4, characterized in that said internal hollow rod (6b) comprises apertures (6f) designed as spray nozzles, which connect said annular gap (6e) with at least one of said connection path (6d) and said interior space (4a) of said discharge housing (4).

7. The double seat valve according to claim 1, characterized in that said hollow rod (6a) is connected to said internal hollow rod (6b) by ribs (6c).

8. The double seat valve according to claim 1, characterized in that said leakage cavity (3) is interconnected with the environment of the double seat valve via a discharge aperture (2c) controllable by means of a locking valve (2d) and mounted in the valve housing (1; 2) between said valve seats (2a, 5; 2b, 6).

9. The double seat valve according to claim 1, characterized in that said interior space (4a) is sealed from the environment of the valve.

* * * * *